United States Patent Office 3,658,917
Patented Apr. 25, 1972

3,658,917
ARYLATION OF ALLYL COMPOUNDS
Richard F. Heck, Wilmington, Del., assignor to
Hercules Incorporated, Wilmington, Del.
No Drawing. Continuation-in-part of application Ser. No.
479,605, Aug. 13, 1965. This application Apr. 16, 1969,
Ser. No. 816,795
Int. Cl. C07c 41/06
U.S. Cl. 260—612 D
12 Claims

ABSTRACT OF THE DISCLOSURE

Allyl compounds are produced by reacting a compound such as allyl chloride with an organometallic compound of a Group VIII metal at a temperature in the range of 0° to about 200° C. in the presence of a highly polar organic compound as solvent. A representative organometallic compound is that prepared by reaction between phenylmercuric chloride and palladium chloride. The process is illustrated by the conversion of allyl chloride to allyl benzene.

---

This application is a continuation-in-part of copending application Ser. No. 479,605, filed Aug. 13, 1965, now abandoned This invention relates to the preparation of substituted ethylenically unsaturated organic compounds and tautomers thereof by reaction of certain ethylenic compounds with organometallic compounds.

In copending application, Ser. No. 479,665, filed Aug. 13, 1965, now U.S. 3,527,794 issued Sept. 8, 1970, there has been described and claimed the reaction of certain ethylenic compounds with organometallic compounds whereby the following overall reaction may be briefly expressed as follows:

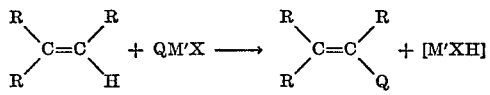

where Q is an organic radical, and R is hydrogen or any of a variety of organic radicals, except those in which R is a —CH$_2$OH group, or an esterified —CH$_2$OH group, or an etherified —CH$_2$OH group, or a —CH$_2$-halogen group, and QM'X is an organometallic compound of a Group VIII metal, M' and an anion X.

In accordance with the present invention, it has now been found that a compound of the formula

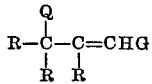

is produced by contacting and reacting a compound of the formula

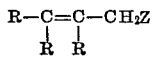

with an organometallic compound comprising an organo group, Q, and a metal of Group VIII at a temperature in the range of 0 to 200° C., in which formulas Q is an organo group; R is hydrogen or a monovalent carbon bonded organic radical, and specifically excluding halogen, —OH, and etherified or esterfied —OH; Z is a monovalent radical, including among said radicals hydrogen, halogen, —OH and etherified or esterified —OH, and Z is halogen, —OH, or etherified or esterified —OH when any R is hydrogen; and G is the same as Z, except in the case where Z is halogen, or etherified or esterified —OH, in which case G is hydrogen.

The group designations refer to the Periodic Chart of the Elements such as is published by Fisher Scientific Company, and such as appears in Handbook of Chemistry and Physics, 33rd edition, pp. 342–343 (1951).

The process of this invention is explained by the following reactions:

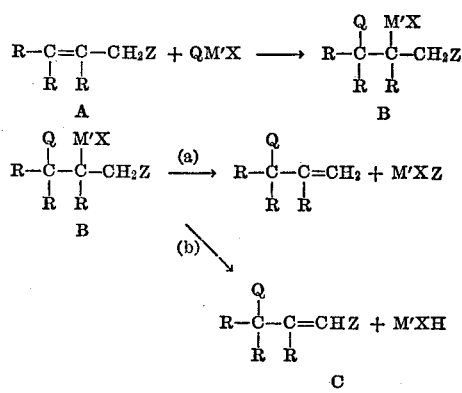

In these reactions, the olefin A first adds the organometallic compound of the formula QM'X, in which Q is an organo group, M' is a Group VIII metal and X is an anion. An elimination of the Group VIII metal as M'XZ or M'XH then takes place. When Z is a halogen, an ether group or carboxylic ester group, the Z is eliminated as in reaction (a), and when Z is not one of these groups, the Z group remains and a hydrogen is eliminated as M'XH as in reaction (b). For instance, when Z is a hydrogen, hydroxyl, hydrocarbon or substituted hydrocarbon group, this group appears in the product.

When the compound of the formula

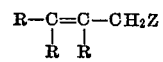

has any R which is hydrogen, the Z substituent is limited to a halogen, —OH, ether, or carboxylic ester group. The reaction which takes place includes an elimination from the —CH$_2$Z group of a hydrogen or a halogen, ether, or carboxylic ester group so that in the resulting product,

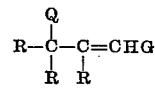

the G is hydrogen, or is —OH when Z is —OH.

When Z is a halogen, —OH, an ether group or a carboxylic ester group, the linkage of Z to carbon is through a carbon to halogen or a carbon to oxygen bond. This is a heteropolar bond. When a group attached by such a heteropolar bond is present, it is susceptible to the elimination in accordance with this invention. The —OH of an allyl alcohol, however, does not appear to be susceptible to this elimination, since the product is a tautomer of a compound which could result from the allyl alcohol without elimination of the —OH group.

When the compound of the formula

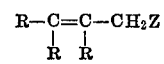

has no R which is hydrogen, the Z group may be any monovalent radical, including a halogen, —OH, ether or carboxylic ester group. When no R is hydrogen and the Z group is a halogen, ether, or carboxylic ester group, the reaction which takes place results in elimination from the —CH$_2$Z group of the halogen, ether or carboxylic ester group, and G is hydrogen in the product of the formula

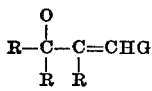

However, when no R is hydrogen and Z is any other monovalent radical than a halogen, ether or carboxylic ester group, the Z group remains in the product and G of the product formula

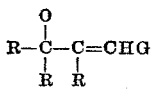

is Z.

In the QM'X compound, the X substituent is an anion exemplified by $Cl^-$, $Br^-$, $I^-$, $F^-$, $CN^-$, $NO_3^-$, $R^4SO_3^-$, $SO_4^{--}$, $HSO_4^-$, carboxylic acid anions, such as acetate, benzoate, trifluoroacetate, $OH^-$, $(OR^4)^-$, $O^{--}$, $BF_4^-$. While QM'X is the structure of a compound wherein the metal has a valence of two, it is understood that $QM'X_2$ will be the structure where M' has a valence of three.

The organomethallic compound QM'X for the reactions expressed above is produced indirectly from another organometallic compound which is a compound of Q and another metal, M, by reaction with a salt of M'. Said other metals are certain metals of Group II-B and IV-A of the periodic chart. This other organometallic compound of Q and M is a compound with a carbon-metal linkage and this organometallic compound may be in the form $Q_2M$, $Q_3M$, $Q_4M$, QMX, $QMX_2$, $QMX_3$, $Q_2MX_2$ or $Q_3MX$, depending on the metal M and its valence. Using QMX for an example, this reaction is expressed as follows: $QMX + M'X_2 \rightarrow QM'X + MX_2$. This equation expresses the reaction when both M and M' have a valence of two, and corresponding equations may be written where M and M' have different valences.

The organometallic compounds include those which have more than one carbon to metal linkage as in the case where the organo group is a metallo organo group. More specifically, if QM'X represents an organometallic compound of this invention, where Q is the organo group, M' is a Group VIII metal and X is an anion, the Q group may be a Q'M'X group. Thus, a bis-organometallic compound of this invention includes those represented by the formula $Q(M'X)_y$ where $y$ is the number of such groups attached to Q. The number of M'X groups per molecule will most commonly be one, occasionally two, and may be three or more, depending on the number of groups which can be attached to a single Q group. For convenience in discussion, the organometallic compounds will be referred to by the convenient formula QM'X, although it is understood that the actual valences will determine the formula in each specific case.

Organometallic compounds of Q and a metal other than a Group VIII metal are well known in the art. In the case of the Group II-B organometallic compounds, represented by the formula QMX, these are well known for Zn, Cd and Hg. However, the organometallic compounds of Zn are highly reactive with water and with many organic functional groups which preclude their use, and, although the organometallic compounds of Cd have mild reactivity, they must be used in on-aqueous medium and are of limited value. The organometallic compounds of mercury, on the other hand, do not react with water and for this reason are the most useful organometallic compounds of the Group II-B metals for use in this invention.

Organometallic compounds of the Group IV-A metals are those of Ge, Sn and Pb. These are generally prepared from organometallic compounds of Group I-A or Group II-A metals and the Q groups are limited only by the limitations of reactivity of the organometallic compound with functional groups that may be present in the Q group. Some of these organometallic compounds are water sensitive and are limited in utility from that standpoint. The tin and lead organometallic compounds are of greatest utility of this group. The tin organometallic compounds can be in the lower or higher valence states. They are formed from organometallic compounds of Groups I-A or II-A and the tin chloride. It is convenient in some cases to produce the tin organometallics from the mercury organometallic, e.g., by reaction of the tin chloride, to form the stannic organometallic compound. Methyl and phenyl tin compounds and substituted phenyl tin compounds are quite suitable for this invention. The lead compounds are prepared similarly to the tin compounds and the organolead compounds are also readily prepared by other methods. They are less reactive with water and have advantages in this respect for use in this invention.

The organomercury compounds are the most generally useful of the various organometallic compounds discussed above because of their ease of preparation, even in aqueous solution, and because of the variety of organic Q groups which may be introduced thereby.

The various methods of preparation and the properties of organometallic compounds which are useful in this invention are discussed in great detail in "Organometallic Compounds," by G. E. Coates, Second Edition, 1960, John Wiley & Sons, Inc., N.Y.

In carrying out process (a), the organometallic compound of the Group VIII metal is produced by the reaction of a Group VIII metal salt with one of the organometallic compounds of mercury, tin or lead, and the organic Q group is transferred to the Group VIII metal. The organometallic compound of the Group VIII metal sometimes has a short life period at ordinary temperature and in such a case should be used promptly or be maintained at reduced temperatures well below room temperature of 24° C., and preferably at a temperature in the range of —20 to —80° C., until used. The usual procedure is to use the organometallic compound promptly without purification, and it can even, in most instances, be produced in situ in the presence of the olefinic compound with which it is to react.

In the in situ process, wherein the organometallic compound of mercury, tin or lead is normally reactive with functional groups in the olefin in the absence of the Group VIII metal salt, the greater reactivity with the Group VIII metal salt to form the organometallic compound of the Group VIII metal prevents, or at least greatly decreases, those undesired reactions which would take place in their absence. In this in situ process, the Group VIII metal salt is referred to hereinafter as a promoter and the Group VIII metal the promoter metal, which will be designated M'.

In a preferred process of this invention, the ethylenic compound A is contacted with the organometallic compound QMX where M is the metal of Group II-B (mercury) or IV-A (tin or lead) in the presence of a Group VIII metal salt. Disregarding any mechanism of the reaction, the overall reaction may be represented by the following diagram:

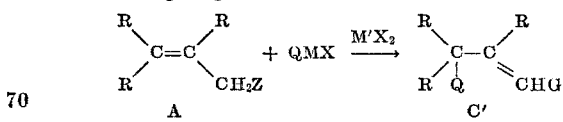

in which C' is produced by contacting an ethylenically unsaturated organic compound A with an organometallic compound of the formula $Q_mMX_n$ and a promoter, $M'X_2$, at a temperature in the range of about 0° C. to about 150° C. The process of this invention is exemplified by the above reaction in which:

Z is $R^2$, $R^3$, H or OH;
G is the same as Z when Z is $R^2$ or OH, and G is H when Z is $R^3$ or H;
R is $R^1$, $R^5$ or $R^6$ with the proviso that when any R is H, Z must be $R^3$ or OH;
$R^1$ is $R^2$ or $R^3$;
$R^2$ is —CN, —$CO_2$ metal, —$CO_2R^5$, —$COR^5$, —$CONR_2^4$, —$C(=NR^4)NR_2^4$, —$NR_2^4$, —$NO_2$ and —$OR^4$;
$R^3$ is Cl, Br, I, F, $OR^4$, or —$O_2CR^4$;
$R^4$ is a hydrocarbon group which, when taken alone, is monovalent, and, when taken in conjunction with another $R^4$ and both are attached to the same or adjacent carbon atoms, forms a hydrocarbon ring including the carbon or carbons to which each $R^4$ is attached;
$R^5$ is H or $R^4$;
$R^6$ is $R^4$ substituted by at least one $R^1$ group;
Q is Ar—, —Ar(OC(O)$CH_3$)CHO, ($CH_3O$)$_y$Ar—, (Cl)$_y$Ar—, (Br)$_y$Ar—, (F)$_y$Ar—, (I)$_y$Ar—, (Cl($CH_3O$)Ar—, Br($CH_3O$)Ar—, F($CH_3O$)Ar—, —Ar($NO_2$)$_y$, benzothienyl, thienyl—, —Ar(COO$R^4$)$_y$, ($CH_3$)$_2$NAr—, ($C_2H_5$)$_2$NAr—, ($C_3H_7$)$_2$NAr—, $CH_3$C(O)NHAr—, HOAr—, $R^4$OAr—, $CH_3$C(O)OAr—, —Ar(COOH)O(O)CC$H_3$, ArC(O)Ar—, —ArCOOH, —ArCHO, ($CH_3$)$_y$Ar—, ($C_2H_5$)$_y$Ar—, ($C_3H_7$)$_y$Ar—, ($C_4H_9$)$_y$Ar—, ($C_5H_{11}$)$_y$Ar—, ($C_6H_{13}$)$_y$Ar—, —Ar(OH)CHO, and Ar$_y$Ar—, where Ar is a benzenoid ring radical such as phenyl, naphthyl, anthracenyl, phenanthrenyl and fluorenyl, and $y$ is a whole number from 1 to 5, preferably 1 to 3;
M is Hg, Sn, or Pb;
$m$ and $n$ are digits whose sum totals the valence of the metal M, and $n$, but not $m$, may be zero; and
X is an anion such as Cl$^-$, Br$^-$, I$^-$, F$^-$, $NO_3^-$, $CH_3CO_2^-$, or $CH_3C_6H_4SO_3^-$,
said promoter being an anhydrous salt or complex of a salt of a Group VIII metal of the group consisting of Pd, Pt, Rh, Ru, Ni and Fe, and an anion X.

In the process of this invention, when Z is OH, a normal addition reaction takes place to form the adduct B in which Z is OH, and the adduct B undergoes the elimination reaction (b) to produce the normal product C″ in which Z is OH. However, this is the less stable tautomer, and the more stable product D is formed from it, so that D is the product actually isolated. The change in structure is indicated below:

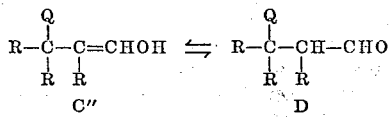

C″         D

It is intended that the production of compound D shall be included within the scope of this disclosure and claims, even though the disclosure and claims are directed to the tautomer C″.

The present invention differs essentially from the invention of copending application Ser. No. 479,665, now U.S. 3,527,794 issued Sept. 8, 1970 in that the presence of the —$CH_2Z$ group on one of the ethylenic carbon atoms provides a different type of elimination step from that provided by those ethylenic compounds which do not possess a —$CH_2Z$ group in the molecules. The Z group is the group eliminated preferentially where Z is halogen or esterified or etherified —OH. When Z is —OH, the hydrogen on the carbon to which the —OH is attached is eliminated. When Z is H, the H is eliminated as a hydride of one of the metals.

When Z is H, the elimination step of the present invention will take place only if other possible elimination reaction do not offer greater competition. For example, a hydrogen on one of the ethylenic carbon atoms offers so much greater competition in the elimination reaction that one of those hydrogens would be eliminated in preference to a hydrogen in the —$CH_2H$ group. However, when there is no hydrogen on an ethylenic carbon and Z is hydrogen, the Z hydrogen will be eliminated in accordance with the present invention. Thus, in the present invention when Z is hydrogen, no R group in the general formula

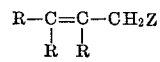

is to be hydrogen. Moreover, if any R group is a competitive group to the —$CH_2H$ group, the reaction with the —$CH_2H$ group will be negligible. The R group is competitive when it is a hydrogen or a —$CH_2Z$ group which is more active than the —$CH_2H$ group. The present invention includes those cases where a more competitive —$CH_2Z$ group is present, but is limited to the case in which none of the R groups is hydrogen when Z is hydrogen. Cases of the latter type are covered in copending application Ser. No. 479,665, now U.S. 3,527,794 issued Sept. 8, 1970.

When Z is OH, the elimination step involves the elimination of hydrogen along with the metal in the form of a metal hydride. This elimination competes successfully with other hydrogen elimination reactions, so that any of the R groups may be hydrogen without changing the course of the reaction. If any of the R groups is a —$CH_2Z$ group, where Z is an acid anion, both types of elimination will occur. In the simple cases where there is only one —$CH_2Z$ group and Z is OH, the aldehyde product can be obtained in fair yields by the process of this invention.

When Z is an acid anion such as halogen, the reaction of the present invention is favored over any of the alternative modes of addition and elimination, and any R may be hydrogen, —$CH_2OH$, or —$CH_3$.

In the process of this invention QM′X appears to add to the ethylenic bond in such a way as is favorable to the elimination reaction of the present invention; thus, M′X appears to add to the ethylenic carbon to which the $CH_2Z$ group is attached. Moreover, where there are two —$CH_2Z$ groups in the molecule, as in the case of $CH_3CH$:$CHCH_2OH$, the M′X favors addition to the carbon holding the —$CH_2OH$ group rather than the carbon holding the —$CH_2H$ group. When Z is halogen, —OCOR, or —OR in the case of one —$CH_2Z$ group in the ethylenic compound and —OH in the case of a second —$CH_2Z$ group, both types of elimination will take place, resulting in a mixture of products.

The above theories of reaction are intended to aid in discussion of the possibilities of the process and not to exclude the possibility of other mechanisms and other intermediates. Nor is it intended that all compounds falling in the scope of the broad formula

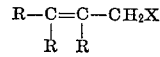

should react the same, since the relative reactivities will be greatly affected by the type of R group, as well as the type of Z group, in the molecule.

Moreover, the mechanism set forth is not intended to give an indication of the order of combining the essential components of the reaction; for, QMX may be contacted with M′$X_2$ first and the resultant complex combined with the olefin, or the QMX may be contacted with the olefin and the resultant mixture contacted with the M′$X_2$, or all three components may be contacted together simultaneously. Moreover, QMX may be formed in situ, where possible and convenient, either in the presence of both the olefin and M′$X_2$, or first in the presence of either one or the other of the olefin and M′$X_2$, then followed by addition of the other of the two.

For convenience, M will be referred to herein as the organometallic metal and M′ as the promoter metal.

The process of this reaction is carried out at a temperature in the range of 0°C. to about 200° C. and preferably in the range of 10° C. to about 150° C., and the reaction may be carried out stepwise using one temperature for what might be considered one of the theoretical steps and using a different temperature for what might be considered a subsequent step.

A solvent ordinarily is used in the process of this invention and should be inert in the sense that it will not react with any of the organometallic compounds involved in the process. The preferred solvents are highly polar organic compounds, namely, the saturated monohydric alcohols containing 1 to 5 carbon atoms, such as methanol, ethanol, propanol, isopropanol and the various butyl and amyl alcohols; the saturated dihydric alcohols containing 1 to 4 carbon atoms, such as ethylene glycol, trimethylene glycol, propandiol-1,2, 2-methyl-propandiol-1,2 and tetramethylene glycol; nitriles containing 1 to 6 carbon atoms apart from the carbon atom in the nitrile group, such as acetonitrile, propionitrile, butyronitrile, valeronitrile, capronitrile and benzonitrile; the saturated monocarboxylic acids containing 1 to 5 carbon atoms, such as formic acid, acetic acid, propionic acid, butyric acid, isobutyric acid, valeric acid and isovaleric acid; the saturated ketones containing 3 to 5 carbon atoms, such as acetone, methyl ethyl ketone, methyl propyl ketone, methyl isopropyl ketone and diethyl ketone; the saturated esters containing 3 to 4 carbon atoms, such as methyl acetate and ethyl acetate; the saturated dialkyl amides containing 3 to 4 carbon atoms, such as dimethylformamide and dimethylacetamide; dimethylsulfoxide; and tetramethylurea.

These solvents need not be anhydrous and, as a matter of fact, may be utilized in admixture with water. When so used, it also is possible to have present other water-soluble organic compounds, such as dioxane, tetrahydrofuran and ethylene glycol dimethyl ether, which will not react with the organometallic compounds present during the process of this invention. The preferred solvents are methanol, ethanol, acetone, acetonitrile, ethyl acetate and acetic acid. Since the organometallic compounds of this invention are not reactive with water or any of the aforementioned solvents, the process of this invention is markedly advantageous over processes based on Grignard reactions using organomagnesium compounds and solvents such as diethyl ether. Not only it is possible in the process of this invention to obviate the cost of providing and maintaining an anhydrous reaction system, it also is possible to utilize solvents which are much less hazardous than the diethyl ether normally used in Grignard reactions.

In the process of this invention a molar amount of $Q_mMX_n$ is required, but a molar amount of the M' salt is not required although some is used up in side reactions. This can be regenerated for reuse. There are many well-known methods for doing this chemically with or without electrical energy. In the presence of acid, for example, [M'XH] can be converted to $M'X_2$ at the anode. In the presence of a redox system, [M'XH] can similarly be converted to $M'X_2$. If M'XH breaks down into $M'+M'X_2$, it can likewise, by either of these methods, be converted to $M'X_2$.

From $M'X_2+MX_2$ in admixture, a mixture of QMX and $M'X_2$ can be produced with varying degrees of ease, the ease of so doing being greatest when M is mercury. In many cases, QH can be reacted directly with

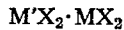

so as to obtain QM'X, which is effective for reaction with the ethylenic compounds. Moreover, this formation of QM'X may be effected in situ, as will be shown hereinafter in the examples.

Since $Q_mMX_n$ and the M' salt can both be regenerated from the end products of an in situ reaction, less than the molar amount of either may be present at the time of reaction. From the economics standpoint, this is advantageous. It is particularly desirable to be able to regenerate M' salt whether in situ or by separation of the M' end product of the reaction, regeneration outside or within the system and reuse of $M'X_2$ salt or a complex thereof. As indicated above, both QMX and $M'X_2$ can be regenerated together in certain instances, and thus, much less than molar amounts of both reagents may be utilized in the system where regeneration is practiced.

The following examples illustrate the use of this invention for the production of a variety of valuable organic compounds and are not to be considered as limiting the scope of the process.

EXAMPLE 1

A mixture of 1.6 grams of cupric chloride and 3.1 grams of phenylmercuric chloride in 8 ml. of methanol was stirred with 0.85 gram of allyl alcohol and 1.0 ml. of 0.1 molar $Li_2PdCl_4$ in methanol at 24° C. for 16 hours. Gas chromatographic analysis of the reaction mixture indicated a yield of 25% of theory of β-phenyl propionaldehyde, which is the stable tautomer of 1-hydroxy-3-phenyl-1-propene resulting from isomerization of the latter. The aldehyde was further identified by the formation and isolation of 0.34 gram of the 2,4-dinitrophenyl hydrazone of β-phenyl propionaldehyde, M.P. 151–151.5° C., which analyzed 57.69% C, 4.47% H and 17.43% N.

EXAMPLE 2

A mixture of 3.7 grams of p-acetoxymercurianisole, 1.6 grams of cupric chloride, 0.85 gram of allyl alcohol, 8 ml. of methanol and 1.0 ml. of 0.1 molar $Li_2PdCl_4$ in methanol was stirred for 72 hours at 24° C. The 1-hydroxy-3-p-anisyl-1-propene formed by the reaction isomerized to p-anisylpropionaldehyde, which was readily characterized by preparation of the corresponding 2,4-dinitrophenylhydrazone, M.P. 140.4–141.2° C., which analyzed 55.22% C and 4.82% H.

EXAMPLE 3

A mixture of 0.35 gram of diphenylmercury, 0.93 gram of allyl acetate and 10 ml. of 0.1 molar $LiPdCl_3$ in acetonitrile solution was stirred at 24° C. for 16 hours. Gas chromatography of the resulting reaction mixture showed it to be 0.03 molar in allylbenzene and 0.017 molar in trans-propenylbenzene, with a trace of cis-propenylbenzene along with some cinamyl acetate. The propenylbenzenes are explained as resulting from isomerization of the initially formed allylbenzene.

EXAMPLE 4

A mixture of 0.31 gram of phenylmercuric chloride, 0.8 gram of diallyl ether and 10 ml. of 0.1 molar $Li_2PdCl_4$ in methanol was stirred 16 hours at 24° C. Analysis by gas chromatography showed that the resulting reaction mixture was 0.017 molar in allyl benzene. This is a yield of 18.7% of theory.

EXAMPLE 5

A mixture of 0.31 gram of phenylmercuric chloride, 0.8 gram of allyl ethyl ether, and 10 ml. of 0.1 molar $Li_2PdCl_4$ in methanol was stirred 16 hours at 24° C. The resulting reaction mixture was shown by gas chromatography to be 0.018 molar in allyl benzene. This corresponds to 20% of theoretical yield.

EXAMPLE 6

A mixture of 0.35 gram of p-chloromercurianisole, 0.94 gram of allyl chloride and 10 ml. of 0.1 molar $Li_2PdCl_4$ in methanol was stirred 16 hours at 24° C. The resulting reaction mixture was shown by gas chromatography to contain estragole in an amount corresponding to a yield of 40% of theoretical.

EXAMPLE 7

When 0.31 gram of phenylmercuric chloride was substituted for 0.35 gram of p-chloromercurianisole in Example 6, allyl benzene was obtained in a yield of 56% of theory.

EXAMPLE 8

When methallyl chloride was substituted for the allyl chloride in Example 7, methallyl benzene was obtained in a yield of 40% of theory.

EXAMPLE 9

A mixture of 4 grams of mercuric acetate and 9.9 grams of anisole was stirred at 100° C. for 1 hour and cooled to 24° C. Then 0.01 gram of palladium acetate and 1 gram of allyl chloride were added, and the mixture was stirred at 24° C. for 16 hours. By gas chromatography, the resulting reaction mixture was shown to be 0.283 molar in estragole. This corresponds to 52% of theoretical yield.

EXAMPLE 10

A mixture of 2.7 grams of mercuric trifluoroacetate, 0.002 gram of palladium acetate, 5 grams of anisole, and 0.49 gram of allyl chloride was stirred for 16 hours at 24° C. The resulting reaction mixture was shown by gas chromatography to be 0.242 molar in estragole. This corresponds to a yield of 53% of theory.

EXAMPLE 11

A mixture of 2 millimoles of phenylmercuric chloride, 1.4 grams of tetramethylethylene, and 20 ml. of 0.1 molar LiPdCl$_3$ in acetonitrile was stirred for 16 hours at 24° C. Analysis by gas chromatography showed that the resulting reaction mixture contained about a 50% yield of phenylhexenes, of which about one-half was 2,3-dimethyl-3-phenylbutene-1.

EXAMPLE 12

A mixture of 50 millimoles of phenylmercuric chloride, 0.85 gram of allyl alcohol, 5 ml. of 0.1 molar Li$_2$PdCl$_4$ in acetic acid, 50 millimoles each of LiCl and CuCl$_2$ in 35 ml. of acetic acid and 5 grams of water was stirred in contact with air at 24° C. for 2 hours. The yield of 3-phenylpropionaldehyde was 18% of theory.

EXAMPLE 13

A mixture of 10 millimoles of 4-chloromercuribenzoic acid, 100 ml. of 0.1 molar Li$_2$PdCl$_4$, and 0.94 gram of allyl chloride was stirred for 24 hours at 24° C. The yield of 4-propenylbenzoic acid was 16% of theory.

The process of this invention will thus be seen to be capable of operation with varying amounts of organometallic compound and promoter and to be operable with varying ratios of organometallic compound to promoter where regeneration is practiced. It is intended that the process covered by the appended claims shall include the situation where Q$_m$MX$_m$ is generated in situ as well as the situation where the promoter salt is regenerated and that the terms used shall be considered broadly in this respect without limitation as to the true mechanism of the reaction involved.

The organylation process of this invention is one of introduction of an organyl group into an ethylenic compound and is applicable to the introduction of an organyl group which will form an organometallic compound of a Group VIII metal, even though the organometallic compound has only a short life. The organyl groups which may be introduced include organyl groups of a wide variety, including aryl, alkaryl and thienyl groups.

What I claim and desire to protect by Letters Patent is:

1. The method of producing a compound of the formula

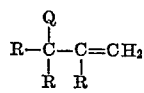

which comprises contacting and reacting, at a temperature in the range of 0° to about 200° C., a compound of the formula

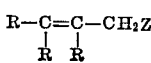

with a Q-substituted mercury compound selected from the group consisting of Q$_2$Hg and QHgX and a salt of palladium in the presence of a highly polar organic compound as solvent, in which formulas Q is thienyl, aryl, or aryl substituted with at least one member of the group consisting of CH$_3$C(O)O—, CH$_3$O—, Cl—, Br—, F—, I—, —NO$_2$, (CH$_3$)$_2$N—, (C$_2$H$_5$)$_2$N—, (C$_3$H$_7$)$_2$N—, CH$_3$C(O)NH—, —OH, —COOH, —CHO, —CH$_3$, —C$_2$H$_5$, —C$_3$H$_7$, —C$_4$H$_9$, —C$_5$H$_{11}$ and —C$_6$H$_{13}$, R is hydrogen or lower alkyl, Z is hydrogen or halogen when all of the R's are lower alkyl and is halogen when any R is hydrogen, and the anion of said palladium salt and the anion X of QHgX both are selected from the group consisting of fluoride, chloride, bromide, iodide, cyanide, nitrate, sulfate, bisulfate, acetate, benzoate, trifluoroacetate and toluenesulfonate.

2. The method of claim 1 in which Z is hydrogen and all of R's are lower alkyl.

3. The method of claim 1 in which Z is halogen and R is hydrogen or lower alkyl.

4. The method of claim 1 in which phenylmercuric chloride is contacted with a palladium chloride salt, and the compound of the formula

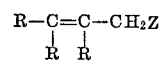

is allyl chloride.

5. The method of claim 1 in which phenylmercuric chloride is contacted with a palladium chloride salt, and the compound of the formula

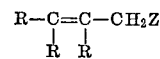

is methallyl chloride.

6. The method of claim 1 in which p-chloromercurianisole is contacted with a palladium chloride salt, and the compound of the formula

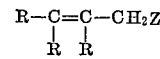

is allyl chloride.

7. The method of claim 1 in which p-acetoxymercurianisole is contacted with a palladium chloride salt, and the compound of the formula

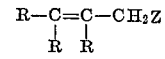

is allyl chloride.

8. The method of claim 1 in which an aromatic compound of the formula QH is contacted with mercuric acetate and palladium acetate.

9. The method of claim 1 in which the polar organic compound is acetonitrile.

10. The method of claim 1 in which the polar organic compound is methanol.

11. The method of claim 1 in which the polar organic compound is acetic acid.

12. The of claim 1 in which water is in admixture with the polar organic compound.

References Cited

UNITED STATES PATENTS 3,527,794  9/1970  Heck et al. _____ 260—623 R

OTHER REFERENCES

Kharasch et al., Grignard Reactions of Non-metallic Substances (1954), 570, 571, 1015, 1159, 1161.

BERNARD HELFIN, Primary Examiner

U.S. Cl. X.R.

260—329 R, 671 A, 671 G, 479 R, 612 R, 650 R, 650 F, 645, 577, 576, 562 R, 624 B, 515 R, 599, 600, 619 F, 465 R, 590, 564 R, 614 R, 613 R, 649 R, 330.5, 515 P